(12) United States Patent
Weissman

(10) Patent No.: US 6,353,811 B1
(45) Date of Patent: *Mar. 5, 2002

(54) CREDIT CARD BILLING SYSTEM FOR IDENTIFYING EXPENDITURES ON A CREDIT CARD ACCOUNT

(76) Inventor: Steven I. Weissman, 10762 Denver Dr., Cooper City, FL (US) 33026

(*) Notice: Subject to any disclaimer, the term of this patent is extended or adjusted under 35 U.S.C. 154(b) by 0 days.

This patent is subject to a terminal disclaimer.

(21) Appl. No.: 09/487,925

(22) Filed: Jan. 19, 2000

Related U.S. Application Data

(63) Continuation-in-part of application No. 09/195,132, filed on Nov. 18, 1998, now Pat. No. 6,032,134.

(51) Int. Cl.[7] ............................................... G06F 17/00
(52) U.S. Cl. ........................................................ 705/40
(58) Field of Search ............................ 705/30, 31, 32, 705/33, 34, 40, 16, 17, 39, 35

(56) References Cited

U.S. PATENT DOCUMENTS

| 4,968,873 | A | * | 11/1990 | Dethloff et al. | ............. 235/380 |
| 5,530,232 | A | * | 6/1996 | Taylor | ......................... 235/380 |
| 5,857,079 | A | * | 1/1999 | Claus et al. | ................... 704/33 |
| 6,006,205 | A | * | 12/1999 | Loeb et al. | ..................... 705/34 |
| 6,016,484 | A | * | 1/2000 | Williams et al. | ............... 705/39 |
| 6,024,286 | A | * | 2/2000 | Bradley et al. | .............. 235/492 |
| 6,070,153 | A | * | 5/2000 | Simpson | ........................ 705/36 |

FOREIGN PATENT DOCUMENTS

| JP | 11353397 A | * | 6/1998 | ........... G06F/17/60 |
| JP | 411245541 A | * | 9/1999 | |
| WO | WO97/31343 | * | 8/1997 | .............. G07F/7/08 |

OTHER PUBLICATIONS

Derwent–ACC–NO:2001–496874; Weissman, Aug. 2001.*
"MCI Makes Moves to Broaden Cellular Reach", Cellular Business, v13n6 pp:92., Dialog File 15, Access No. 01269831, Jun. 1996.*
"Bank of America: Bank of America Introduces New Business Card", Business Wire., Dialog File 810, Access No. 0499741, Jul. 1995.*

(List continued on next page.)

*Primary Examiner*—James P. Trammell
*Assistant Examiner*—Pierre E. Elisca
(74) *Attorney, Agent, or Firm*—Robert M. Downey, P.A.

(57) ABSTRACT

A data processing system and method are provided for allocating all expenditures, accrued interest attributable to each expenditure, and payments made by respective credit cardholders, to sub-accounts specifically designated by the cardholder. In a preferred embodiment, at the time of each expenditure, the cardholder electronically enters the sub-account to which the expenditure is to be allocated with the use of an electronic device having a keypad and display. The data processing system allocates to each designated sub-account all expenditures specified, as well as all interest charges that accrue as to each designated sub-account to which the interest charges are attributable. The data processing system further allocates payments made by the cardholder to the designated sub-account(s) according to the cardholder's instructions and calculates interest charges allocable to each designated sub-account as adjusted after each payment. The data processing system also tracks and calculates all expenditures and payments on a cumulative basis (i.e., without regard to the sub-accounts) so that monthly or other period billing statements will reflect cumulative expenditures for the billing period, and prior outstanding account balances and credits. The system also calculates and generates a breakdown of new expenditures to each sub-account for the billing period, as well as cumulative outstanding balances on each sub-account.

22 Claims, 7 Drawing Sheets

OTHER PUBLICATIONS

Romei, L., "The Times, They are a–changin' . . . ", Managing Office Technology, v39n8, pp:13., Dialog File 15, Access No. 00901832, Aug. 1994.*

"The Corporate Credit Card–It's Time Has Come", Credit & Financial Management, v77n2 pp:34–35, Dialog File 15, Access No. 00034199, Feb. 1975.*

Rowland M., "Putting Your Kids on the Payroll", Nation's Business. Dialog File 15, Access No. 01139183, v84n1 pp:33–34, Jan. 1996.*

Palmer et al., "Charge It", Journal of Accountancy, v184n1, pp:51–54, Dialog File 15, Access No. 01471981, Jul. 1997.*

* cited by examiner

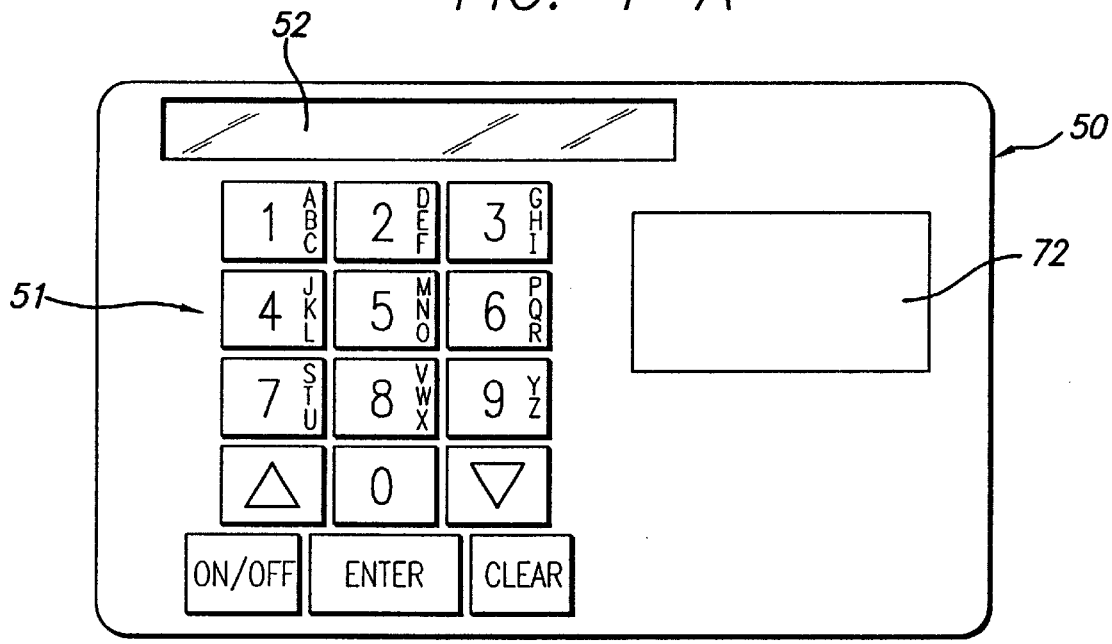
FIG. 1-A
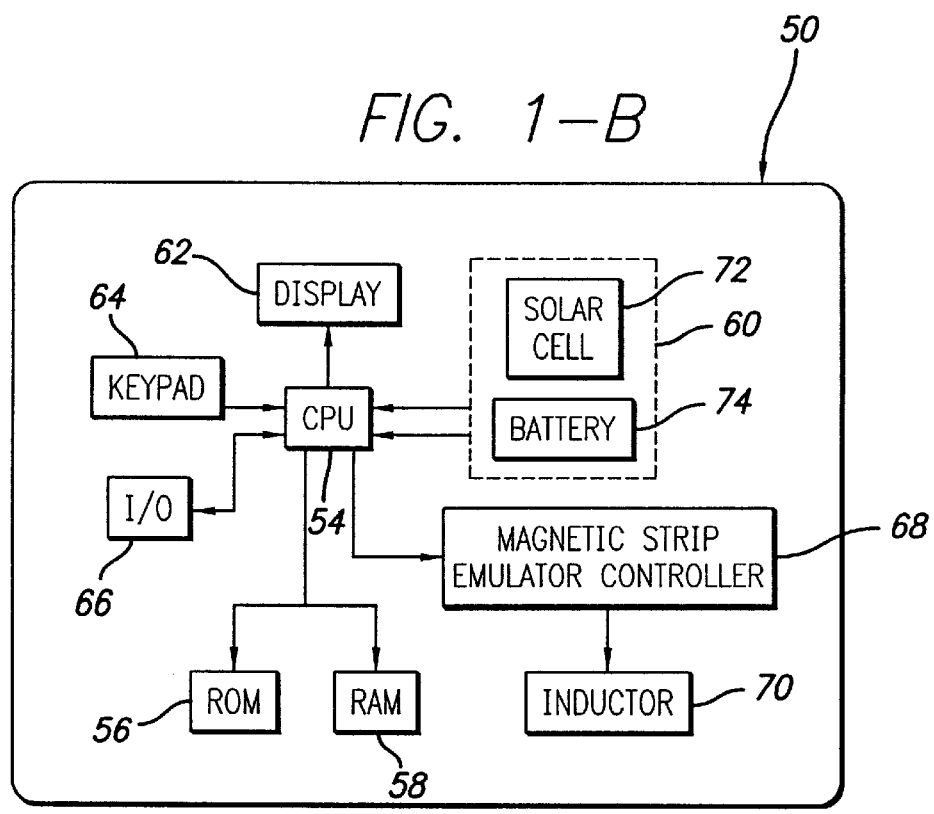
FIG. 1-B

FIG. 2-A

CREDIT CARD STATEMENT

Prepared for John, Sue and  Closing Date 10/31/98
Jack Law Firm  Acct. #6241-448-31076

| Previous Card Balance | Card Payments | New Card Charges | Interest | New Card Balance |
|---|---|---|---|---|
| 14,978.51 | -2,944.51 | 2,454.00 | 229.16 | 14,717.16 |

CARD TRANSACTIONS FOR JOHN — 7A

| | | |
|---|---|---|
| October 1, 1998-XYZ Airlines | SA 010 | 284.00 |
| October 3, 1998-Office Supply Superstore | SA 401 | 101.29 |
| October 16, 1998-Manuel's Bar & Grill | SA 210 | 64.40 |
| October 25, 1998-Finely & Jacobs, Court Reporters | SA 010 | 625.00 |
| Activity for John | New Charges | 1,074.69 |

CARD TRANSACTIONS FOR SUE — 7B

| | | |
|---|---|---|
| October 2, 1998-Circuit Court of Dade County Filing Fee | SA 210 | 128.00 |
| October 6, 1998-ABC Gas | SA 401 | 14.00 |
| October 19, 1998-Genesis Restaurant | SA 010 | 74.00 |
| October 30, 1998-Office Supply Superstore | SA 010 | 288.00 |
| Activity for Sue | New Charges | 504.00 |

CARD TRANSACTIONS FOR JACK — 7C

| | | |
|---|---|---|
| October 15, 1998-Host Airlines | SA 210 | 422.00 |
| October 18, 1998-Knoxville Hotel | SA 210 | 216.00 |
| October 30, 1998-Avis Car Rental | SA 401 | 237.31 |
| Activity for Jack | New Charges | 875.31 |

SUB-ACCOUNT 010  — 4

| | |
|---|---|
| October 1, 1998-American Airlines (John) | 284.00 |
| October 19, 1998-Genesis Restaurant (Sue) | 74.00 |
| October 25, 1998-Finely & Jacobs Court Reporters (john) | 625.00 |
| October 30, 1998-Office Supply Superstore (Sue) | 288.00 |
| Total New Charges Sub-Account 010 | 10 — 1,271.00 |
| Previous Card Balance Sub-Account 010 | 11 — 12,034.00 |
| Interest on Sub-Account 010 | 9 — 229.16 |
| Card Payments/Credits on Sub-Account 010 | 11A — -0- |
| New Balance on Sub-Account 010 | 13,534.16 |

SUB-ACCOUNT 210 — 5

| | |
|---|---|
| October 2, 1998-Circuit Court of Dade County Filing Fee (Sue) | 128.00 |
| October 15, 1998-Host Airlines (Jack) | 422.00 |
| October 16, 1998-Manuel's Bar & Grill (John) | 64.40 |
| October 18, 1998-Knoxville Hotel (Jack) | 216.00 |
| Total New Charges Sub-Account 210 | 14 — 830.40 |
| Previous Card Balance Sub-Account 210 | 12 — 1,928.16 |
| Interest on Sub-Account 210 | -0- |
| Card Payments/Credits on Sub-Account 210 | 15 — 1,928.16 |
| New Balance on Sub-Account 210 | 830.40 |

SUB-ACCOUNT 401 — 6

| | |
|---|---|
| October 3, 1998-Office Supply Superstore (John) | 101.29 |
| October 6, 1998-ABC Gas (Sue) | 8 — 14.00 |
| October 30, 1998-Avis Car Rental (Jack) | 237.31 |
| Total New Charges Sub-Account 401 | 16 — 352.60 |
| Previous Card Balance Sub-Account 401 | 1,016.35 |
| Interest on Sub-Account 401 | 13 — -0- |
| Card Payments/Credits on Sub-Account 401 | 1,016.35 |
| New Balance on Sub-Account 401 | 17 — 352.60 |

*FIG. 2-B*

PAYMENT COUPON

Account Number: 6241-448-31076
        Closing Date: 10/31/98

John, Sue & Jack Law Firm

| | |
|---|---|
| YOUR TOTAL BALANCE | $14,717.16 |
| Minimum Payment Due | 600.00 |
| Please Enter Amount of Payment Enclosed | 1,183.00 |

ALLOCATION OF PAYMENT TO SUB-ACCOUNTS — *18A*

Please allocate our enclosed payment to the sub-accounts as follows:

$-0-to SA 010; Please apply enclosed payment of $1,183 to pay in full SA 210 and SA 401.

FIG. 3

CREDIT CARD BILLING SYSTEM FOR IDENTIFYING EXPENDITURES ON A CREDIT CARD ACCOUNT

This application is a continuation-in-part application based upon previously filed application Ser. No. 09/195,132 filed on Nov. 18, 1998, now U.S. Pat. No. 6,032,134.

BACKGROUND OF THE INVENTION

1. Field of the Invention

The present invention relates to a credit card billing system and method, and more particularly, to a system and method which provides for allocation of expenditures made by a credit cardholder, as well as allocation of interest attributable to each of the expenditures and payments made by the cardholder, to sub-accounts specifically designated by the cardholder using an electronic device, wherein the designated sub-account is transmitted to the credit card company along with the expenditure amount, the credit card account number and other data. Examples of an electronic device suitable for this purpose include: a programmable transaction card (i.e., a smart card); an electronic wallet; a portable electronic terminal and/or a personal computer. Examples of credit cards include credit cards, debit cards, check cards, and the like.

2. Description of the Related Art

At the current time, all issuers of credit cards, such as Visa, Mastercard, and American Express, render periodic billing statements to their cardholders which list all expenditures and accrued interest. Where multiple cards are issued under one account, such as a business organization having cards for multiple employees or a family with several family members using an account, some credit card issuers list the expenditures and also reflect which person using the account incurred each expenditure. However, presently known credit card billing systems and methods do not provide a means for credit card users to have expenditures, accrued interest on each expenditure and payments, allocated to one or more sub-accounts specifically designated by the credit card user within a single credit card account.

It is commonly necessary for a credit card account holder to account for and allocate each expenditure for various tax or business purposes, such as:

(i) Tax deductible versus non-deductible expenditures;

(ii) Tax deductible versus non-deductible interest expense;

(iii) Expenditures, including interest, which may be billed (i.e., passed thru) to a customer or client of a cardholder; and (iv) General or specific cost control accounting. Under the present billing system utilized by all credit card issuers, in order to account for each individual expenditure, the cardholder must examine each expenditure and determine from the person incurring the expenditure, which may be an employee, family member, etc. the nature and purpose of the expenditure. This presents a substantial accounting undertaking which is exacerbated where an organization or family has numerous persons incurring expenditures on one account.

Furthermore, when paying a credit card bill, present billing methods do not allow a cardholder to specify a sub-account(s) to which all or a portion of the payment is to be credited, and to thereby leave outstanding balances, with accruing interest charges, in other sub-accounts, in accordance with the tax, business or accounting needs of the cardholder. At the present time, there is no method by which a cardholder can allocate payments so as to control and identify the specific prior expenditures as to which interest is accruing. This shortcoming may have adverse tax and business consequences for the cardholder. For instance, a tax deduction for the payment of accrued interest expense may be lost or the right to pass the interest charges on to a customer or client of the cardholder may be lost because the interest expense cannot be tied to a particular expenditure or group of expenditures. The present invention, therefore, produces a useful, concrete and tangible result because the creation of the sub-accounts results in substantive changes in tax and business consequences to the cardholder which cannot be achieved with any presently existing credit card billing methods or bookkeeping method which may be employed by the cardholder.

My invention, as described and claimed in previously filed patent application Ser. No. 09/195,132, provides a unique system and method which allows each person incurring credit card charges to designate a specific sub-account to which each expenditure and interest attributable thereto shall be allocated by the credit card issuer to be reflected on each billing statement to the cardholder. The cardholder may thereby obtain the information provided by the separate sub-account listings on each credit card statement to satisfy and resolve the credit card holder's need to account for various categories of expenditures, such as:

(i) Tax deductible versus non-deductible expenditures;

(ii) Tax deductible versus non-deductible interest expense;

(iii) Expenditures, including interest, which may be billed (i.e., passed thru) to a customer or client of a cardholder; and (iv) General or specific cost control account. In addition, this unique method will also allow the credit card holder to specify each sub-account to which each monthly or other periodic payment by the cardholder is to be allocated, thereby determining which specific expenditures are to remain outstanding and accrue interest charges.

In a preferred embodiment, the sub-accounts are electronically entered by the cardholder at the time of purchase with the use of an electronic device having a keypad, a memory and a display. Specifically, the present invention contemplates the use by the cardholder of a smart card, electronic wallet, a portable electronic terminal, and/or a personal computer for electronically entering the designated sub-accounts at the time of purchase.

A smart card is an electronic device typically including a microprocessing unit or CPU and a memory suitable for encapsulating within a small flexible plastic card, for example, one that is about the size of a credit card. The smart card additionally includes some form of an interface for communicating with an external system. Examples of smart cards of this nature are disclosed in the Wallerstein U.S. Pat. No. 5,955,961, Nagata, et al., U.S. Pat. No. 4,959,788, and Piosenka, et al., U.S. Pat. No. 5,777,903. Typical applications for smart cards include the transfer of information of all types relative to banking and other financial transactions, transportation, subscriber health and identification. The smart card additionally includes input/output (I/O) signal interface for transferring various I/O signals between the smart card and an external system. The interface may take the form of a contact interface, which requires that the smart card come into contact with the external system, or a peripheral thereof, for proper transfer of signals. Alternatively, the interface may take the form of a radio frequency (RF) interface for allowing communication between the smart card and the external system via the transmission and reception of RF signals. The external system may take the form, for example, of a card reader, a merchant's point of sale system, or an automated teller machine.

Ideally, the smart card includes a microprocessing unit (MPU) or a central processing unit (CPU) for executing instructions stored in memory. The smart card further includes a display, coupled to the MPU, for displaying information, a keypad, coupled to the MPU and the display, for entering data by the user, and the interface for transferring signals between the smart card and the external system when the smart card is coupled to the external system. The smart card may further be provided with a power source such as a battery and/or photovoltaic cells for providing power to the smart card when the smart card is exposed to light, thus providing a solar power source.

Electronic wallets come in various forms and typically include a keypad and a display. U.S. Pat. Nos. 4,614,861 to Pavlov, et al. and U.S. Pat. No. 4,707,594 to Roth disclose electronic wallets in the form of self-contained cards including a power supply, user interface, processor and static magnetic strip. Roth's patent is very much related to wallet design, with media interfaces limited to a keypad and display. Pavlov also provides keypad input and display output and relates primarily to data security. Additionally, an electronic input/output port is also provided. A number of other patents and publications discuss electronic wallets that provide a processor, memory, a user interface, a power supply, and a card processor reader/writer.

U.S. Pat. Nos. 4,277,837 to Stuckert and U.S. Pat. No. 4,523,297 to Ugon, et al. are examples of electronic wallets that provide magnetic reader/writer capability. Ugon demonstrates the viability of communication between an electronic wallet and a card micro module via a smart card reader/writer and also includes an electronic wallet card insertion slot. Stuckert discusses a card processor interface and a radio frequency transmitter. U.S. Pat. No. 5,748,737 to Dagger is an example of an electronic wallet which provides multiple data media interfaces. Standard interfaces will include a smart card reader/writer, a magnetic reader/writer, a radio frequency transceiver and a user interface. Dagger discloses a compact electronic wallet which includes a interface for receiving input by the user, including medium transaction and commands, a processor connected with the interface for controlling the operation of the electronic wallet in response to the user input, and a smart card interface connected with the processor for transferring data between the electronic wallet and processing circuitry on a multi-media transaction card. The Dagger compact electronic wallet further provides magnetic medium interface means connected with the processor for reading and writing data to a magnetic medium on the multi-media transaction card.

A further example of this type of electronic wallet is provided by Mondex. An electronic purse card is outlined in a publication entitled "MONDEX-The Worldwide Alternative to Cash." Electronic monies are carried on a smart card and an optional handheld wallet that includes a display, keypad, and a smart card interface is also provided.

U.S. Pat. Nos. 4,701,601 to Francini, et al., U.S. Pat. No. 4,868,376 to Lessin, et al., and U.S. Pat. No. 4,814,591 to Nara, et al. are all examples of electronic wallets with a magnetic medium emulator and user interface, while U.S. Pat. No. 4,791,283 to Burkhardt and U.S. Pat. No. 4,786,791 to Hodama are examples of magnetic strip emulator cards.

SUMMARY OF THE INVENTION

The present invention provides a data processing system and method for allocating transaction expenditures incurred by a credit cardholder, and accrued interest attributable thereto, to sub-accounts specified at the point of purchase by the person incurring the charge. In a preferred embodiment, the sub-accounts are electronically entered by the cardholder with the use of an electronic device. Examples of electronic devices which are contemplated for use in conjunction with the system of the present invention include, but are not limited to, programmable transaction cards (i.e., smart cards and integrated circuit cards), electronic wallets, a portable electronic terminal, and/or a personal computer which may be equipped with a credit card reader/writer peripheral device and a modem. As used hereinafter, the term "electronic device" shall be deemed to include the above-identified devices. Furthermore, as used hereinafter, the term "credit card" shall be deemed to include credit cards, debit cards, check cards, and the like.

The present invention also provides a data processing system and method for allocating payments by a credit cardholder of principal and/or accrued interest to the sub-accounts designated by the cardholder. The data processing system tracks all expenditures and interest attributable thereto, as well as payments, in specific sub-accounts to be designated respectively, by the person incurring the expenditure or making the payments, so that aggregate expenditures, interest accruals and payments may be determined for each sub-account for any accounting purpose desired by the credit cardholder. The present invention, therefore, produces a useful, concrete and tangible result because the creation of the sub-accounts may also result in substantive changes in tax and business consequences to the cardholder which cannot be achieved with any presently existing credit card billing methods or bookkeeping method which may be employed by the cardholder. The present invention also results in efficiencies and cost savings by facilitating identification by the credit card user at the point of purchase of the sub-account to which the expenditure is to be allocated.

BRIEF DESCRIPTION OF THE DRAWINGS

For a fuller understanding of the nature of the present invention, reference should be had to the following detailed description taken in conjunction with the accompanying drawings in which:

FIG. 1-A is a front elevational view of a smart card having a keypad and display, in accordance with one preferred embodiment of the invention;

FIG. 1-B is a block diagram illustrating the functional relationship of the general components of the smart card of FIG. 1-A;

FIGS. 2-A and 2-B is an example of a monthly statement issued by a credit card issuer where the expenditures have been allocated to sub-accounts designated by the person(s) incurring the expenditure(s) at the point of purchase and where there are three different individuals, "John, Sue and Jack," incurring expenditures on the account. FIG. 2-B also illustrates how the cardholder may elect to allow interest to accrue on one or more classifications of expenditures (i.e., sub-accounts) and not as to other expenditures;

FIG. 3 is an example of a payment made by a credit card holder designating the specific sub-accounts to which the payment is to be allocated and corresponds to the credit card statement in FIGS. 2-A and 2-B;

Like reference numerals refer to like parts throughout the several views of the drawings.

DETAILED DESCRIPTION OF THE PREFERRED EMBODIMENT

Figure 4:
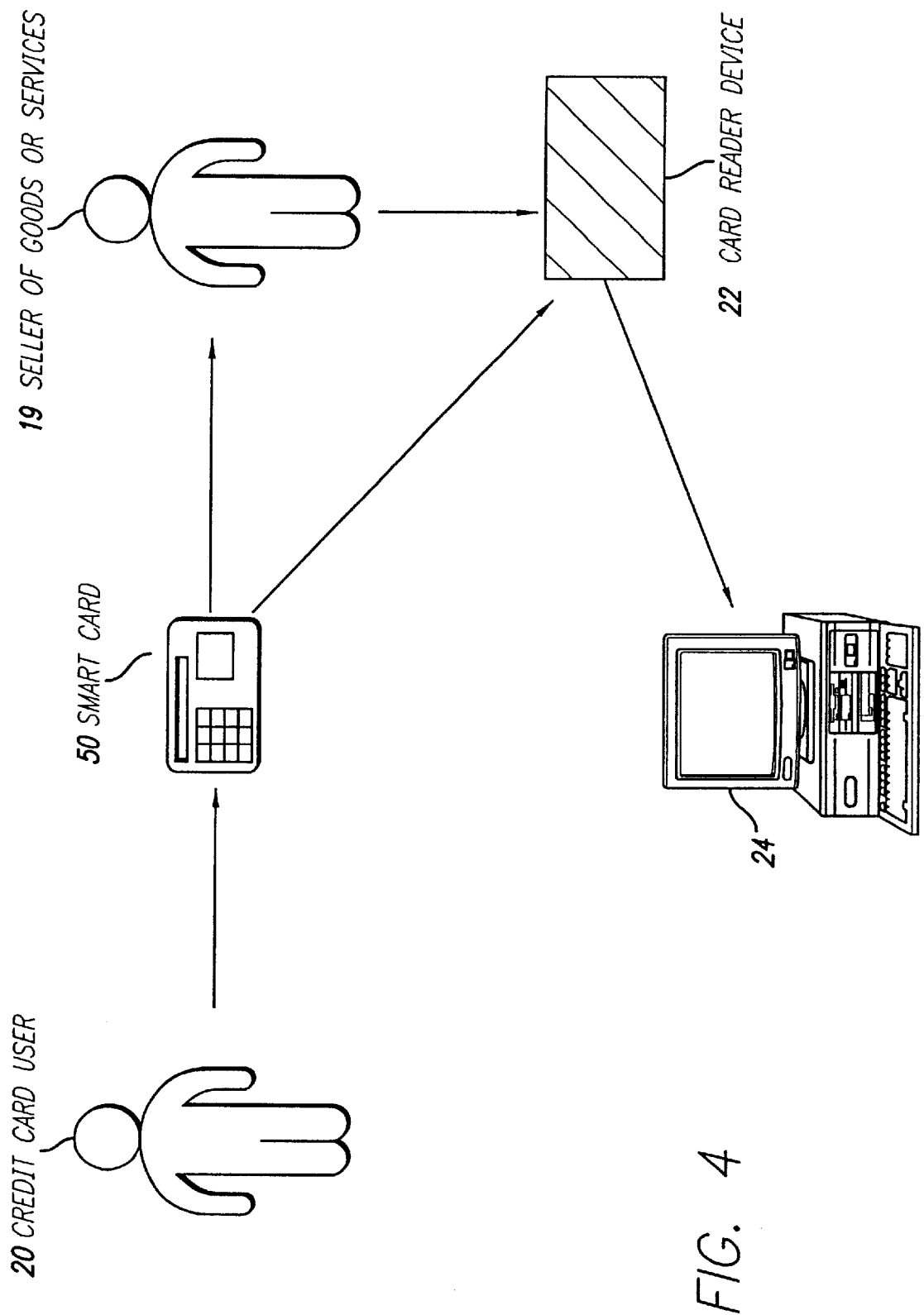
FIG. 4 depicts an overview of the flow of information from the point of purchase in the credit card billing system, wherein the cardholder's account number and designated sub-account, along with other information, are transmitted to a processing center of the credit card billing system to allocate all charges and interest attributable to charges to the sub-account specifically designated by the cardholder.

The present invention is directed to a data processing system and method for use in a credit card billing system to allocate all expenditures and interest attributable to expenditures, as well as payments, to sub-accounts specifically designated by the cardholder.

In a first preferred embodiment, the cardholder is provided with a programmable transaction card, such as a smart card 50, having means for electronically entering and/or selecting the designated sub-accounts. More particularly, FIG. 1-A shows an example of a smart card 50 which includes a keyboard 51 for use in selecting the desired sub-account just prior to a transaction. The designated sub-account, together with other pertinent information, is entered by the user with the keyboard to the central processing unit in a form which may be transferred from an interface (e.g., a magnetic strip) to an external system such as a card reader or a merchant's point of sale system. Rather than entering the designated sub-account, a plurality of sub-account numbers, names or other designations can be stored in memory on the smart card, allowing the cardholder to scroll through the stored sub-accounts with the use of up and down scroll keys on the keyboard with the sub-account list being visible on the display 52

Referring to FIG. 1-B, the major components of the circuit utilized in the smart card are shown, in accordance with a preferred embodiment. Specifically, the smart card is provided with a central processing unit (CPU) 54, a read only memory (ROM) 56, dynamic memory (RAM) 58, a power supply system 60, a display circuit 62, a keyboard circuit 64, an input/output port 66, a magnetic strip emulation controller 68, and a transducer/indicator 70. Other interfaces may be utilized in alternative embodiments to present information from the smart card to an external system such as a card reader or a merchant's point of sale system in machine-readable form. The power supply system may include a solar cell 72 and a rechargeable battery 74. The CPU 54 receives power from the power supply system and distributes the power to the other systems and circuits. The input/output port 66 allows the smart card to be connected to a separate device, such as a personal computer, for downloading and uploading data between the smart card's memory and the personal computer. Specifically, a plurality of sub-account designations of the cardholder's accounting system may be downloaded onto the memory of the smart card. As mentioned above, this enables the cardholder to scroll through the stored sub-account list so that the cardholder can designate a particular sub-account to which a transaction will be allocated.

Referring to FIG. 4, an overview of the flow of information from the cardholder to the credit card issuer is shown. More specifically, at the point of purchase, the cardholder 20 enters the designated sub-account on the smart card 50 and then presents the smart card to the merchant 19. The designated sub-account, and other pertinent information, is presented by the smart card 50 in a machine-readable form. The merchant 19 places the smart card 50 in a reader device 22 which reads the designated sub-account, along with other pertinent information, and transmits the information to the card issuer or other processing location 24 where an integrated software package allocates all expenditures and interest accruals for each credit card account in accordance with the sub-accounts specified, as well as in general account (non-sub-account) form. Alternatively, the cardholder 20 may be provided with a reader device 22 for reading the designated sub-account and other information from the smart card 50 and transmitting the designated sub-account and other information to the processing location 24. This is particularly useful for e-commerce (i.e., on-line) transactions, such as those which are carried out on the internet. In this instance, the card reader device 22 may include a peripheral device connected to a personal computer for reading the designated sub-account and other pertinent information stored on the smart card. In another example, the card reader device 22 might be a stand-alone terminal operated by either the cardholder 20 or the merchant 19, wherein the reader device is provided with a modem for transmitting the information to the processing center 24. Alternatively, the sub-account can be entered on the personal computer, using the keys of a conventional keyboard, when making an on-line transaction.

Figure 6:
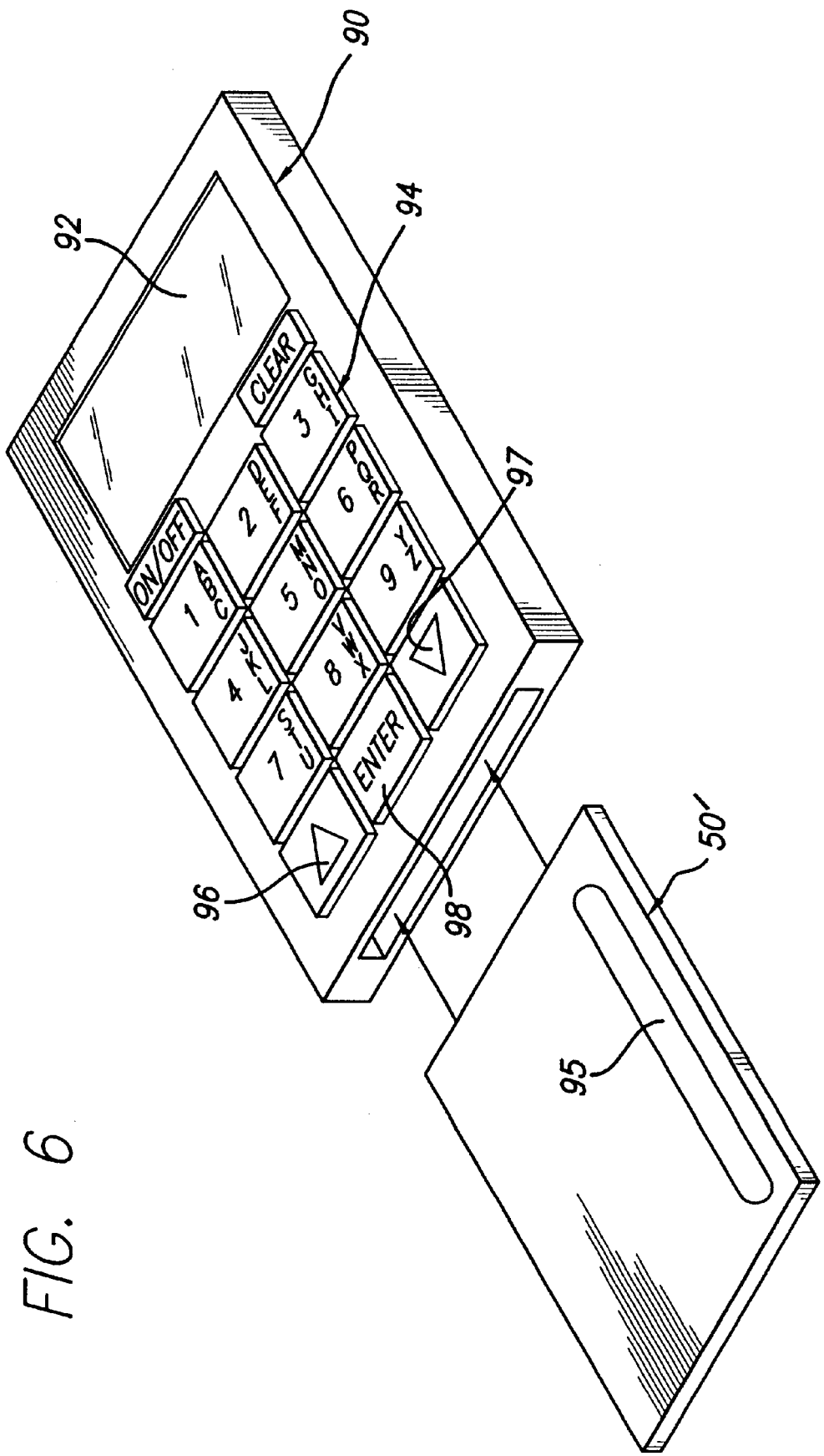
FIG. 6 is a front perspective view of an electronic wallet device for use in the system and method of the present invention, in accordance with one preferred embodiment thereof, wherein the electronic wallet device includes means for entering the designated sub-account by the cardholder for storage on the cardholder's credit card and subsequent reading thereof by an electronic reader device at the point of purchase.

Referring to FIG. 6, another embodiment of the electronic device used for designating the sub-accounts is shown. In this embodiment, an electronic wallet 90 or like device is provided to the cardholder. The electronic wallet is provided with a display 92 and a keypad 94 for entering and/or selecting the designated sub-account just prior to a transaction. In use, the cardholder inserts a credit card 50' (e.g., a credit card, debit card, check card, smart card, or the like) within the electronic wallet 90. The credit card 50' is provided with means 95 for storing and presenting information in a form which is readable by a reader device. With the credit card 50' inserted within the electronic wallet 50, the user enters the designated sub-account to which a subsequent charged transaction is to be allocated. The designated sub-account is entered using the keypad 94, by depressing the alphanumeric keys corresponding to the sub-account and then depressing the enter key. It is noted that the keys of the keypad 94 may be provided with alphanumeric characters, as shown in FIG. 6, for entering sub-accounts consisting of numbers, letters or a combination of both. The keypad is further provided with up and down scroll keys 96, 97 for scrolling through a list of sub-accounts which may be stored in a memory means of the electronic wallet 90. When the cardholder enters the sub-account using the keypad 94, or scrolls up and down using keys 96, 97 through the list of stored sub-accounts, the sub-accounts are presented on the display 92. Upon depressing the enter key 98, the sub-account appearing in the display is temporarily stored on the credit card 50'. At this point, the credit card 50' can be removed from the electronic wallet and placed within the reader device 22 by either the cardholder 20 or a merchant 19 (see FIG. 4). The reader device 22 reads the designated sub-account which was previously entered on the credit card 50' using the electronic wallet 90. The transaction data, including the designated sub-account, are then transmitted by the reader device 22, or another device, to the central processing center 24. At the central processing location 24, or other account processing location, an integrated software package allocates all expenditures and interest accruals for each credit card account in accordance with the sub-accounts specified, as well as in general account (non-sub-account) form.

The electronic device used in conjunction with the system and method of the present invention, including the embodiments of FIGS. 1-A, 1-B, and 6, may be structured to hold the entered sub-account for a predetermined amount of time (e.g., 2 minutes), such as during an awake mode. At the end of the timed period, the last sub-account which had been entered into the electronic device will expire or become erased. At this point, the electronic device may go back into a sleep mode until the user wishes to enter another sub-account. Additionally, the electronic device may be provided with an ON/OFF button to activate and deactivate the device. A CLEAR button may be further provided to enable the user to remove a previously entered sub-account so that a different sub-account can be entered. The CLEAR button is particularly useful when it is necessary to make several transactions in a short period of time or if the user makes a mistake in entering the sub-account. The user may further use the CLEAR button, or wait until a previously entered sub-account has been erased at the end of a timed period, in order to make an expenditure transaction without designating a sub-account. In this instance, an expenditure for which no sub-account has been designated would be listed on the account statement in a default sub-account established for expenditures for which no sub-account was specifically selected by the card user.

FIGS. 2-A and 2-B show an example of a monthly statement issued by a credit card issuer, wherein the expenditures made by cardholders on the account have been allocated to three separate sub-accounts, indicated by reference numerals 4, 5 and 6. More specifically, FIGS. 2-A and 2-B illustrate multiple pages of a monthly statement for a law firm's credit card account on which three individuals are authorized to make expenditures, i.e., John, Sue and Jack. FIG. 2-A illustrates how the $14.00 charge made by "Sue" is reflected in the general listing of charges, indicated by reference numeral 7. This charge by Sue is further allocated to sub-account 401, indicated by reference numeral 6 in FIG. 2-B, along with all charges to sub-account 401, as designated by the three authorized credit card users (John, Sue and Jack) 7A, 7B and 7C.

FIG. 2-B also illustrates that interest charges on the credit card are allocated to the specific sub-accounts to which they are attributable. Thus sub-account 010, indicated by reference numeral 4, reflects an interest charge for the billing period of $229.16, indicated by reference numeral 9, which is based upon the new charges, indicated by reference numeral 10, for sub-account 010 and the previous outstanding balance, indicated by reference numeral 11, of sub-account 010. As distinguished from sub-account 010, sub-account 210, indicated as reference numeral 5, and sub-account 401, indicated as reference numeral 6, reflect that there are no interest charges for the billing period attributable to charges in those sub-accounts (see reference numerals 12 and 13). This is because the previous outstanding balance of sub-accounts 210 and 401 were paid in full, as indicated at reference numerals 14, 15, 16 and 17.

FIG. 2-B also illustrates that the credit card payment for the prior month was allocated by the credit card issuer to specific sub-account(s) as directed by the account holder. Thus, FIG. 2-B reflects that the previously outstanding balance of sub-account 210 (see reference numeral 14) was paid in full (as indicated at reference numeral 15) and the previously outstanding balance of sub-account 401 (see reference numeral 16) was paid in full (as indicated at reference numeral 17), while no portion of the prior payment was allocated to the previously outstanding balance of sub-account 010 (see reference numerals 11 and 11A).

It should be noted that while not illustrated in FIGS. 2-A and 2-B, the system of the present invention may be configured so that the credit card user is not required to designate a sub-account for each expenditure. In such event, all expenditures for which no sub-account has been designated would be listed on the account statement in a default sub-account established for expenditures for which no sub-account was specifically selected by the card user.

For further illustration of the substantive consequences of this ability to allocate expenditure transactions, interest accruals and payments to specific sub-accounts, assume the following: Sub-account 010 represents the law firm's costs incurred in representing a client, Mike Smith, in a personal injury claim. The law firm's fee agreement provides for Mike Smith to pay all out-of-pocket costs incurred by the firm at the time of any recovery for him. When Mike Smith's case is concluded, as a result of the present invention providing for sub-accounts, the law firm may bill Mr. Smith for all interest accrued on his sub-account as an out-of-pocket cost.

If a credit card, using any billing method in use today, were utilized by the law firm, there would be no way for the law firm to establish the interest charges directly attributable to expenditures incurred for Mr. Smith's case, and if interest on the credit card account were to be passed through at all, some pro-ration would be required between the expenditures incurred for Mr. Smith and all other expenditures and only a portion of the total interest charges could reasonably be attributable to Mr. Smith's case and not 100%, as accomplished by the present invention. Therefore, this is one illustration of how the present invention provides a useful, concrete and tangible result which cannot be achieved with any presently existing credit card billing methods or any bookkeeping method which may be employed by the cardholder.

FIG. 3 is an example of a Payment Coupon 18 to be used by the credit cardholder to designate the sub-accounts to which each monthly or other periodic payment is to be allocated. FIG. 3 demonstrates that a payment is being made which is to pay the full balance of sub-accounts 210 and 401 (i.e., SA 210 and 401), while no portion of sub-account 010 is being paid, as set forth under the allocation instructions, as indicated at reference numeral 18A. This allocation will result in continued accrual of interest charges with respect to the balance in sub-account 010, whereas in the absence of the ability to make an allocation among sub-accounts, interest would for all purposes be deemed to accrue as to the entire unpaid, unallocated balance due on the account. The present invention creates the advantage of allowing the credit card account holder the ability to select specific expenditures which are to remain outstanding, thereby having interest accrue only on the selected charges. Such a selection is also important, inter alia for income tax purposes, where interest on certain expenses may be non-deductible and also for business purposes where interest charges may be passed on to a customer or client for whose benefit the expenditures were incurred as discussed above.

Another advantage of the invention is that the system of sub-accounts performs an important record keeping function in allowing the credit card user to track and account for all credit card expenditures by category. The categories of charges are selected by the credit cardholder and may serve tax, business or other record keeping purposes, such as:

(i) Tax deductible versus non-deductible expenditures;

(ii) Tax deductible versus non-deductible interest expense;

(iii) Charges, including interest, which may be billed (i.e., passed thru__ to a customer or client of a cardholder; and (iv) General or specific cost control accounting. The ability of the person incurring the expenditure to allocate the expenditure at the point of purchase to a particular sub-account, wherein there are numerous persons authorized to use one credit card account, presents a further improvement over present credit card billing methods. This ameliorates the need to have follow-up communications with each user of the credit card to determine the purpose and nature of each expenditure which must ordinarily be done when a credit card statement in use today is received which does not have any method for establishing sub-accounts.

Figure 5:
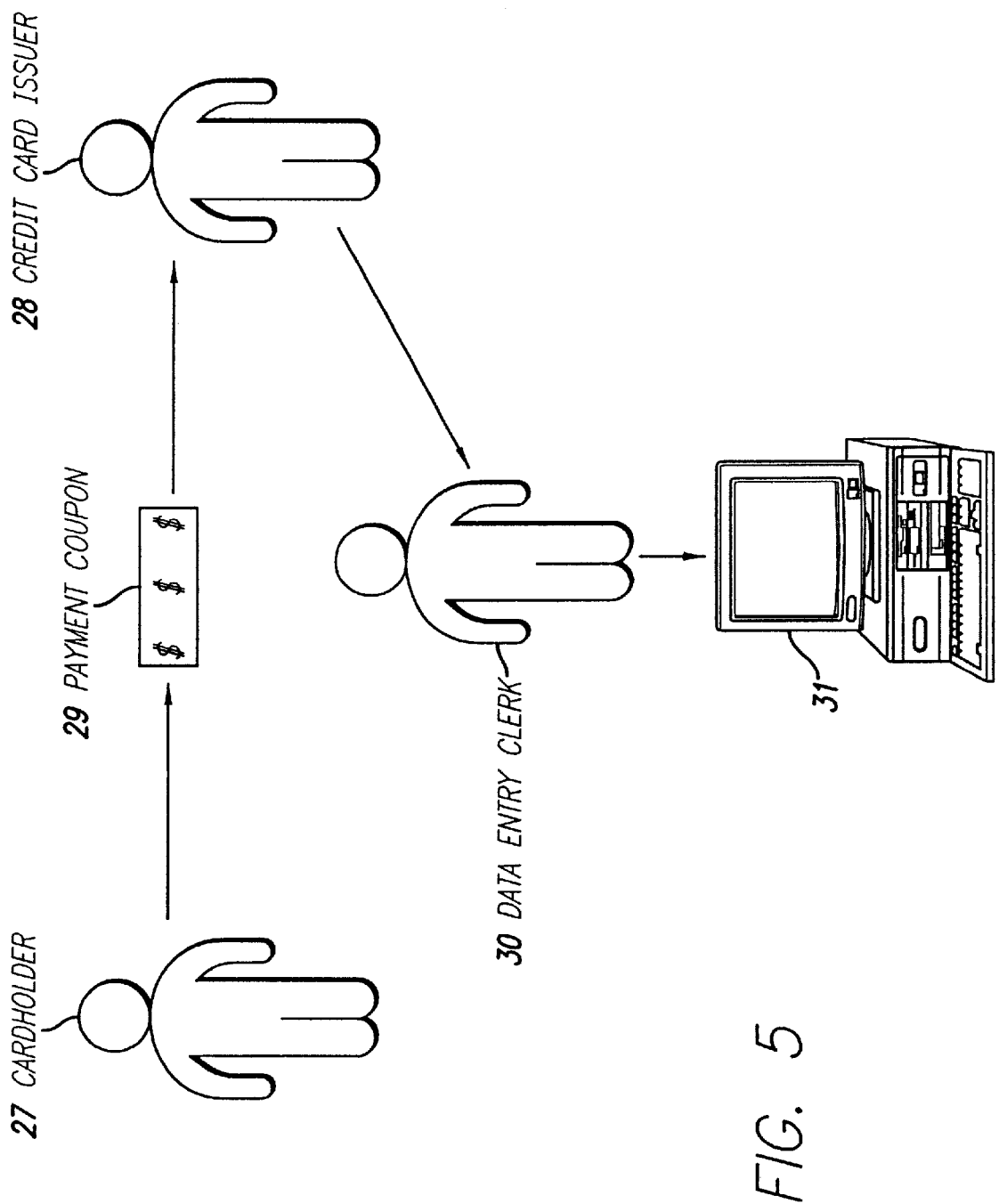
FIG. 5 depicts an overview of the flow of information from the cardholder in the credit card billing system to allocate all payments by the cardholder to the sub-accounts specifically designated by the cardholder.

FIG. 5 presents an overview of the information flow that occurs in the credit card billing system to allocate all payments to sub-accounts specifically designated by the paying cardholder. A cardholder 27 sends payment to the credit card issuer 28 accompanied by a specifically designed payment coupon 29 which designated the particular sub-account(s) to be paid. Payment is processed by the data entry clerk 30 who enters the payment information from the payment coupon 29 into a computer 31 capable of producing printed output and storing data. An integrated software package allocates the payment to the sub-accounts as well as the overall account balances, as specified by the cardholder's instruction on the payment coupon 29. An alternative, not depicted, is for the cardholder to electronically transmit payment to the credit card issuer accompanied by instructions designating the particular sub-accounts paid.

The computer system and software is configured so that cumulative expenditures, interest accruals and payment information may be calculated and printed on an annual or any other time period basis in addition to regular billing cycles.

While the instant invention has been shown and described in what is considered to be a preferred and practical embodiment thereof, it is recognized that departures may be made within the spirit and scope of the present invention which, therefore, should not be limited, except as set forth within the following claims as interpreted under the doctrine of equivalents.

What is claimed is:

1. A data processing system for managing and producing statements for a credit card account of a cardholder comprising:

first means operable by the cardholder for electronically entering one or more sub-accounts, designated by the cardholder, to which expenditures charged to the credit card account are to be allocated, and said first means further including means for electronically transmitting said entered sub-accounts to a processing location at the time of each expenditure;

second means for processing data for said credit card account including each of said designated sub-accounts;

third means for storing said data on a storage medium;

fourth means for processing said data, said processing including:

(i) allocating said expenditure transactions to said one or more designated sub-accounts; and (ii) allocating finance charges among said one or more designated sub-accounts to which said finance charges are attributable;

fifth means for processing said data, said processing including allocating payments made by the cardholder to said one or more designated sub-accounts; and sixth means for processing periodic statements, said processing including:

(i) calculating said expenditure transactions, said finance charges, and said payments made by the cardholder;

(ii) allocating said calculated expenditure transactions, said calculated finance charges and said calculated payments to said one or more designated sub-accounts; and (iii) generating the periodic statements including a report showing said calculated expenditure transactions, said calculated finance charges, and said calculated payments on both a sub-account basis and a cumulative basis for the credit card account.

2. A data processing system as recited in claim 1 wherein said sixth means further comprises:

means for identifying said expenditure data including said expenditure transactions and said payments according to specified time periods; and means for retrieving said expenditure data according to said specified time periods.

3. A data processing system as recited in claim 1 wherein said sixth means further comprises:

means for calculating a total of said expenditure transactions, said finance charges and credits for the entire credit card account on a cumulative basis.

4. A data processing system as recited in claim 3 wherein said sixth means further comprises:

means for calculating a total of said expenditure transactions, said finance charges and said credits for each of said one or more designated sub-accounts over a specified period.

5. A data processing system as recited in claim 4 wherein said second means further comprises:

means for retrieving from said storage medium said data for each of said one or more designated sub-accounts;

means for correcting and updating said data for each of said one or more designated sub-accounts;

means for inputting and storing on said storage medium data regarding increases or decreases in said credit card account data and said data for each of said one or more designated sub-accounts;

means for retrieving said data from said storage medium including said credit card account data and data for each of said one or more designated sub-accounts, said means for retrieving being structured to permit retrieval of said data according to specified billing periods, total expenditures, and credits for said credit card account and for each of said one or more designated sub-accounts;

means for calculating and processing said data on a daily basis to obtain aggregate year-end reports showing a total of said expenditure transactions and said credits for said credit card account and for each of said one or more designated sub-accounts; and means for storing the data regarding said aggregate year-end report on said storage medium.

6. A data processing system as recited in claim 1 wherein said means for electronically entering said designated one or more sub-accounts includes a smart card.

7. A data processing system as recited in claim 6 wherein said smart card comprises:

means for entering said designated one or more sub-accounts;

means for selecting said designated one or more sub-accounts;

means for presenting said entered or selected designated one or more sub-accounts in a machine-readable form to an external system.

8. A data processing system as recited in claim 7 wherein said smart card comprises:

a central processing unit;

memory means suitable for encapsulating within a small flexible plastic card about the size of a credit card for storing a plurality of said sub-accounts and the identification of the sub-account to which each expenditure is assigned by the user;

a power supply system;

a display coupled to the central processing unit;

a keyboard for entering and selecting data including said designated one or more sub-accounts;

an interface for transferring input/output signals, including the designated sub-account to which each expenditure is assigned, between the smart card and an external system such as a card reader or a merchant's point of sale system; and an input/output port.

9. A data processing system as recited in claim 1 wherein said means for electronically entering said designated one or more sub-accounts comprises an electronic wallet.

10. A data processing system as recited in claim 9 wherein said electronic wallet comprises:

means for storing a plurality of said sub-accounts;

means for selecting or entering said designated one or more sub-accounts;

means for communication with a credit card having memory means and;

means for transferring said selected designated one or more sub-accounts to said credit card memory means in a form that is machine-readable by an external system such as a card reader or a merchant's point of sale system.

11. A data processing system as recited in claim 10 wherein said electronic wallet further comprises:

display means for displaying said designated one or more sub-accounts;

a keypad for entering said designated one or more sub-accounts to said credit card memory means in a form that is machine-readable by an external system such as a card reader or a merchant's point of sale system; and means for scrolling through said stored plurality of sub-accounts.

12. A method for managing and producing statements for a credit card account of a cardholder, said method comprising the steps of:

designating, at times of making expenditures, one or more expenditure groupings on a single credit card account, to which each expenditure is to be allocated in accordance with the accounting needs of the cardholder;

electronically entering said designated one or more expenditure groupings using an electronic device operable by the cardholder, and transmitting from said electronic device said entered one or more expenditure groupings to a processing location at the time of each expenditure:

processing said data, including said expenditures, for said credit card account including each of said designated expenditure groupings;

storing said data on a storage medium;

processing said data including the further steps of:
(i) allocating said expenditures to said one or more designated expenditure groupings; and
(ii) allocating finance charges among said one or more designated expenditure groupings to which said finance charges are attributable;

processing said data including allocating payments made by the cardholder to said one or more designated expenditure groupings; and processing periodic statements including the further steps of:
(i) calculating said expenditures, said finance charges, and said payments made by the cardholder;
(ii) allocating said calculated expenditures, said calculated finance charges, and said calculated payments to said one or more designated expenditure groupings; and
(iii) generating the periodic statements including providing a report showing said calculated expenditures, said calculated finance charges, and said calculated payments on both an expenditure grouping basis and a cumulative basis for the credit card account.

13. The method as recited in claim 12 further including the steps of:

identifying said data including said expenditures and said payments according to specified time periods; and retrieving said data according to said specified time periods.

14. The method as recited in claim 12 wherein said step of processing periodic statements further includes the step of:

calculating a total of said expenditures, said finance charges, and credits for the entire credit card account on a cumulative basis.

15. The method as recited in claim 12 wherein said step of processing periodic statements further includes the step of:

calculating a total of said expenditures, said finance charges, and said credits for each of said one or more designated expenditure groupings over a specified period.

16. The method as recited in claim 15 wherein said step of processing data for said credit card account includes the further steps of:

retrieving from said storage medium said data for each of said one or more designated expenditure groupings;

correcting and updating said data for each of said one or more designated expenditure groupings;

inputting and storing on said storage medium data regarding increases or decreases in said credit card account data and said data for each of said one or more designated expenditure groupings;

retrieving said data from said storage medium including said credit card account data and data for each of said one or more designated expenditure groupings, said step of retrieving further including retrieving said data according to specified billing periods, total charges, and credits for said credit card account and for each of said one or more designated expenditure groupings;

calculating and processing said data on a daily basis to obtain aggregate year-end reports showing a total of said expenditures and said credits for said credit card account and for each of said one or more designated expenditure groupings; and storing the data regarding said aggregate year-end report on said storage medium.

17. The method as recited in claim 12 wherein said step of providing an electronic device includes providing a smart card.

18. The method as recited in claim 17 further comprising the steps of:

entering said designated one or more expenditure groupings into a memory of said smart card;

subsequently selecting said designated one or more expenditure grouping on said smart card;

presenting said entered or selected designated one or more expenditure groupings in a machine-readable form to an external system.

19. The method as recited in claim 18 further comprising the steps of:

providing said smart card with a central processing unit;

providing said smart card with memory means suitable for encapsulating within a small flexible plastic card about the size of a credit card for storing a plurality of said expenditure groupings and the identification of the expenditure grouping to which each expenditure is assigned by the user;

providing said smart card with a power supply system;

providing said smart card with a display coupled to the central processing unit;

providing said smart card with a keyboard for entering data for entering and selecting said data, including said designated one or more expenditure groupings;

providing said smart card with an interface for transferring input/output signals, including the designated expenditure grouping to which each expenditure is assigned, between the smart card and an external system such as a card reader or a merchant's point of sale system; and providing said smart card with an input/output port.

20. The method as recited in claim 12 wherein said step of providing electronic device includes providing an electronic wallet.

21. The method as recited in claim 20 further comprising the steps of:

providing said electronic wallet with means for storing a plurality of said expenditure groupings;

providing said electronic wallet with means for selecting or entering said designated one or more expenditure groupings;

providing said electronic wallet with means for communication with a credit card having memory means; and providing said electronic wallet with means for transferring said selected designated one or more expenditure groupings to said credit card memory means in a form that is machine-readable by an external system such as a card reader or a merchant's point of sale system.

22. The method as recited in claim 21 further comprising the steps of:

providing said electronic wallet with display means for displaying said designated one or more expenditure groupings;

providing said electronic wallet with a keypad for entering said designated one or more expenditure groupings to said credit card memory means in a form that is machine-readable by an external system such as a card reader or a merchant's point of sale system; and providing said electronic wallet with means for scrolling through said stored plurality of expenditure groupings.

* * * * *